(12) United States Patent
Pearson et al.

(10) Patent No.: US 8,758,490 B2
(45) Date of Patent: Jun. 24, 2014

(54) METHOD OF FORMING AN ELECTRICALLY CONDUCTIVE HOLLOW FIBER SEPARATION MODULE

(75) Inventors: John Pearson, Fellside Meadows (GB); Caytlin Green, Bensham (GB)

(73) Assignee: Nano-Porous Solutions Limited, Gateshead, Tyne and Wear (GB)

( * ) Notice: Subject to any disclaimer, the term of this patent is extended or adjusted under 35 U.S.C. 154(b) by 202 days.

(21) Appl. No.: 13/388,972

(22) PCT Filed: Aug. 2, 2010

(86) PCT No.: PCT/GB2010/051273
§ 371 (c)(1),
(2), (4) Date: Mar. 5, 2012

(87) PCT Pub. No.: WO2011/015860
PCT Pub. Date: Feb. 10, 2011

(65) Prior Publication Data
US 2012/0151890 A1  Jun. 21, 2012

(30) Foreign Application Priority Data
Aug. 5, 2009 (GB) .................... 0913645.8

(51) Int. Cl.
*B01D 53/22* (2006.01)
(52) U.S. Cl.
USPC ............... 96/8; 95/43; 95/44; 95/45; 96/7; 96/10
(58) Field of Classification Search
USPC ............... 95/43, 44, 45; 96/7, 8, 10
See application file for complete search history.

(56) References Cited

U.S. PATENT DOCUMENTS

| | | | |
|---|---|---|---|
| 4,326,960 A | 4/1982 | Iwahori et al. | |
| 4,770,778 A * | 9/1988 | Yokoyama et al. | 210/321.79 |
| 5,141,031 A * | 8/1992 | Baurmeister | 139/383 R |
| 5,284,584 A | 2/1994 | Huang et al. | |
| 5,695,702 A * | 12/1997 | Niermeyer | 264/129 |
| 6,582,496 B1 * | 6/2003 | Cheng et al. | 95/46 |
| 7,948,142 B2 * | 5/2011 | Dobashi et al. | 310/195 |
| 8,225,941 B2 * | 7/2012 | Ogawa et al. | 210/500.23 |

(Continued)

FOREIGN PATENT DOCUMENTS

| | | |
|---|---|---|
| EP | 0442147 A2 | 8/1991 |
| EP | 0547575 A1 | 6/1993 |

(Continued)

OTHER PUBLICATIONS

International Search Report and Written Opinion received in corresponding PCT patent application No. PCT/GB2010/051373, dated Dec. 2, 2010.

*Primary Examiner* — Jason M Greene
*Assistant Examiner* — Anthony Shumate
(74) *Attorney, Agent, or Firm* — Wong, Cabello, Lutsch, Rutherford & Brucculeri, LLP

(57) ABSTRACT

A method of forming a fluid separation filter for use in a fluid separation device includes aligning a series of fluid separation or drying fibers (102) and fixing them together using a self-adhesive and electrically conductive tape (116) or by weaving copper threads between them. The connected fibers then form a mat and a strip of potting sealant (112) may be added, if required, along the top and bottom of the fibers. The mat may then be rolled to form a bundle of fibers.

18 Claims, 10 Drawing Sheets

(56) References Cited

U.S. PATENT DOCUMENTS

| | | | |
|---|---|---|---|
| 8,486,583 B2* | 7/2013 | Nakanishi et al. | 429/523 |
| 8,506,750 B2* | 8/2013 | Hayashi et al. | 156/308.2 |
| 2001/0035374 A1* | 11/2001 | Yamamoto et al. | 210/321.8 |
| 2002/0179516 A1* | 12/2002 | Behrendt et al. | 210/321.8 |
| 2003/0024817 A1* | 2/2003 | Chun et al. | 204/549 |
| 2004/0072151 A1* | 4/2004 | Arisawa et al. | 435/5 |
| 2004/0195226 A1* | 10/2004 | Stabile | 219/213 |
| 2005/0015044 A1* | 1/2005 | Harttig et al. | 604/29 |
| 2005/0103423 A1* | 5/2005 | Ide et al. | 156/64 |
| 2007/0144716 A1 | 6/2007 | Doh et al. | |
| 2009/0206026 A1* | 8/2009 | Yoon et al. | 210/490 |
| 2010/0015492 A1* | 1/2010 | Katayama | 429/31 |
| 2010/0224548 A1* | 9/2010 | Tada et al. | 210/321.8 |
| 2012/0018371 A1* | 1/2012 | Cote | 210/500.23 |

FOREIGN PATENT DOCUMENTS

| | | |
|---|---|---|
| GB | 2254340 A | 10/1992 |
| WO | 0044483 A2 | 8/2000 |
| WO | 2008110820 A1 | 9/2008 |
| WO | 2009053760 A1 | 4/2009 |

* cited by examiner

FIGURE. 13
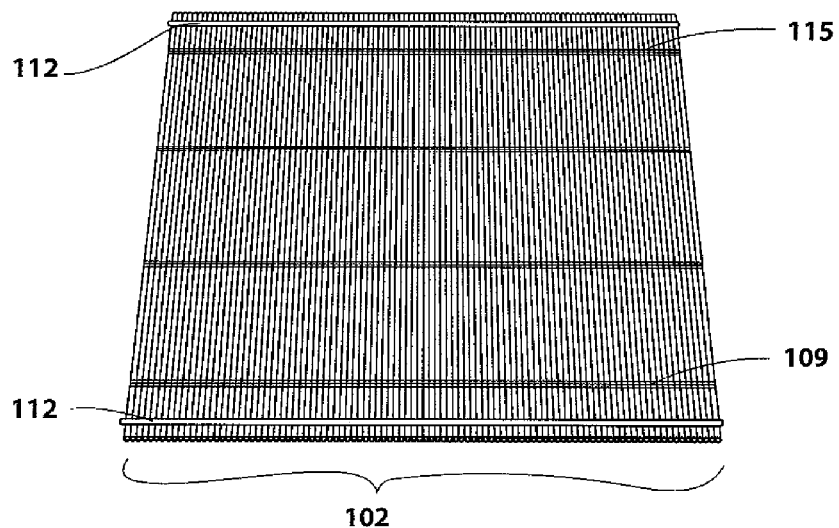
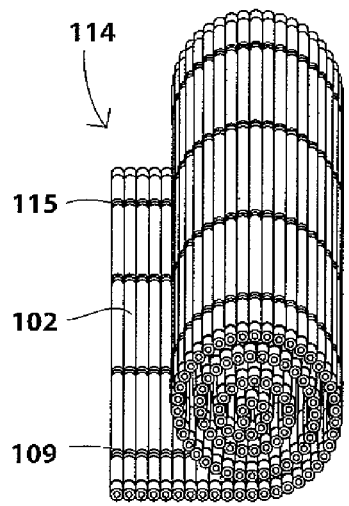
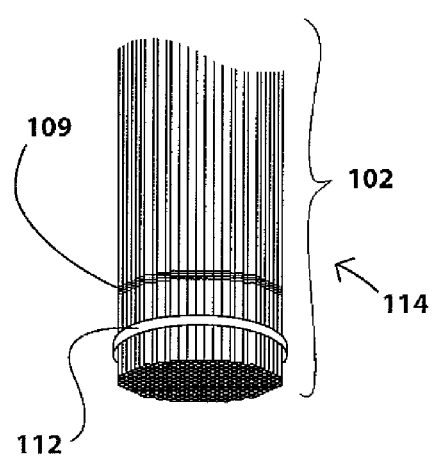
FIGURE. 14     FIGURE. 15

FIGURE. 19
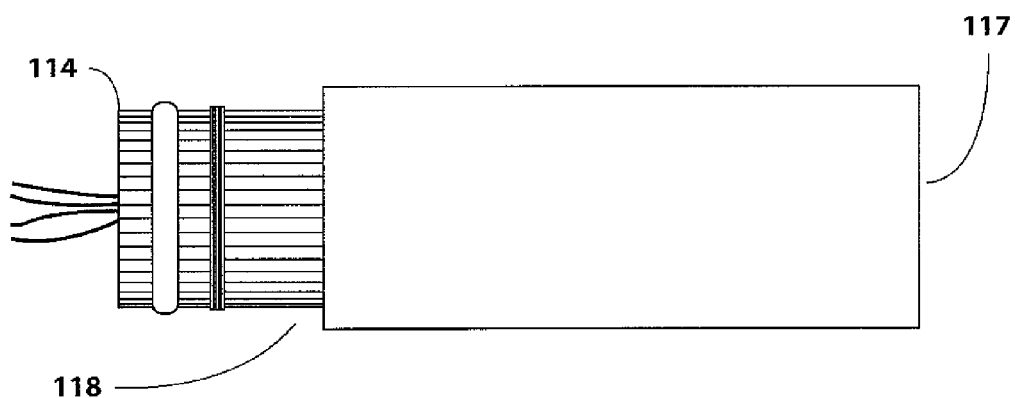
FIGURE. 20
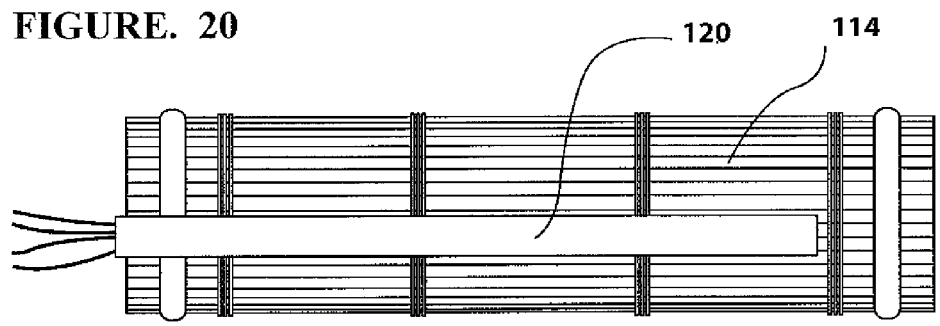
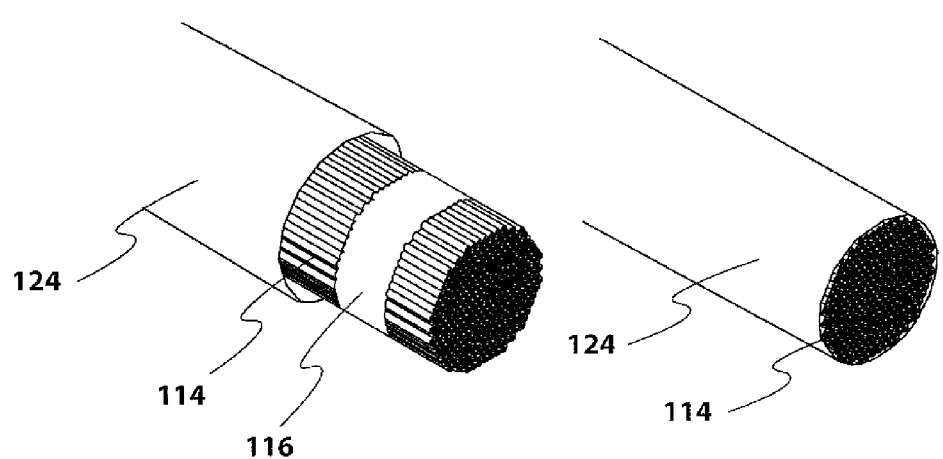
FIGURE. 22  FIGURE. 23

METHOD OF FORMING AN ELECTRICALLY CONDUCTIVE HOLLOW FIBER SEPARATION MODULE

CROSS-REFERENCE TO RELATED APPLICATIONS

This application is a nationalization of PCT/GB2010/051273 which has an International Filing Date of Aug. 2, 2010, and claims priority to British application GB0913645.8 filed on Aug. 5, 2009. The disclosures of both of these applications are hereby incorporated by reference in their entireties.

BACKGROUND OF THE INVENTION

1. Field of the Invention

The present invention relates to a fluid separation filter, and relates particularly but not exclusively, to a fluid separation filter for removing water vapor from air.

2. Description of the Invention

Bundles of tubular members of porous material may be used to remove water vapor or other contaminants from an air flow. Water is adsorbed by the porous material constituting the tubular members as air flows through them. An example of this method of drying air is described in PCT publication number WO2009/053760. Attention is also to be drawn to WO2008/110820 which is directed towards the preparation and use of regenerable adsorption units and in particular regenerable hollow fibers and electrically regenerable fibers.

Once saturated with water porous tubular members may be regenerated and used to remove water vapor from more air. Regeneration is achieved by heating the porous tubular members thereby causing evaporation of the adsorbed water away there from. An electrical current may be used to heat such porous tubular members. Porous tubular members are first extruded as two layers of material, namely an inner adsorbent layer and an outer electrically conductive layer made from e.g. a mixture of copper and graphite, before a voltage is applied across them, causing a current to flow, thereby generating heat.

An evenly distributed flow of current through the porous tubular members in a bundle of such members is required in order to evenly regenerate each individual tubular member in the bundle. If more current flows through one porous tubular member than another, then such members will heat up to different temperatures the cooler of which will not regenerate as efficiently as the one which heats up the most. This reduces the air drying efficiency of a bundle of porous tubular members as a whole.

For example, an existing bundle has a current applied to it using a conducting resin that is used at either end of the bundle to seal the ends. A current is applied to the outside of the resin and current flows through the resin to the conductive coating on the fibers, and along this way to the more conductive region at the other end of the fibers, thereby generating heat in the fiber. However, differences in resistance result in different current flows through fiber coatings located within the bundle. Fiber at the center of the bundle receives less current and therefore heats up less. The problem with the prior art is that there exists no way of providing a substantially even flow of current through each individual tubular member in a bundle of such tubular members.

There further exists the problem of evenly applying potting compound between the fibers already assembled in a bundle.

Preferred embodiments of the present invention seek to overcome the above disadvantages of the prior art.

DETAILED DESCRIPTION OF THE INVENTION

According to the present invention there is provided a method of forming a fluid separation filter for use in a fluid separation device, the method comprising the steps of:
aligning a plurality of elongate fluid separation members;
fixing a plurality of fluid separation members together using flexible fixing means adapted to conduct electricity; and
rolling a plurality of the fixed fluid separation members into a bundle.

Fixing the fluid separation members in a bundle together using electrically conducting fixing means ensures that the fluid separation members are each in direct electrical connection with a power source. This provides the advantage of increasing the extent to which a substantially similar current may be made available to flow through each of the fluid separation members in the bundle.

In a preferred method the fixing means is at least one first wire.

In another preferred method at least one first wire is weaved between at least adjacent fluid separation members.

This maximizes the surface area of fluid separation members which the wire is in contact with providing the advantage of improving the electrical connection between a power source and each of the fluid separation members in a bundle. Woven wires will contact almost the entire circumference of the outer surface of a fiber coating.

Furthermore, this ensures that each fluid separation member in a bundle is adapted to be in direct electrical connection with a power source providing the advantage that a substantially similar amount of current flows through each fluid separation member in a bundle.

In a further preferred method the fixing means is at least one tape, the tape being at least partially adhesive.

This provides the advantage of increasing the speed with which each fluid separation member in a bundle can be made adapted to be in direct electrical connection with a power source.

In a preferred method the step is also included of bringing at least one second wire into electrical contact with at least one tape.

In another preferred method the step is also included of at least partially electrically insulating at least one of the first and second wires.

In a further preferred method the step is also included of applying a line of potting compound to the fluid separation members, the line being perpendicular to the separation members, before rolling into a bundle.

This provides the advantage of enabling potting compound to be applied evenly between the fluid separation members in a bundle. Also the advantage is provided of holding the fluid separation members in a bundle in such a bundle arrangement. Furthermore, if the potting compound is electrically conducting this acts to improve the electrical connection between adjacent fluid separation members in a bundle providing the advantage of increasing the extent to which a substantially similar current may be made to flow through each fluid separation member in the bundle.

In a preferred method the step is also included of compressing the fluid separation members in the bundle together.

This provides the advantage of holding the fluid separation members in a bundle in such a bundle arrangement. Furthermore, by forcing adjacent fluid separation members into engagement with one another this provides the advantage of increasing the extent to which a substantially similar current may be made to flow through each fluid separation member in the bundle.

In another preferred method the step is also included of at least partially electrically insulating the fluid separation members from each other.

This provides the advantage of ensuring that a substantially uniform voltage is applied across and that a substantially uniform current flows through each fluid separation member.

In a further preferred method the step is also included of at least partially electroplating the external surface of at least one said fluid separation member.

This provides the advantage of improving the electrical connection between the fluid separation members and the fixing means used hold them together.

The method may further comprise inserting said bundle into a sleeve of heat shrink material and heating said heat shrink material to provide a gripping pressure to said bundle.

A sleeve of heat shrink material placed around the bundle and then heated to encase the bundle provides the advantage that sleeve provides protection for the fibers in the bundle thereby make the bundle very handable and unlikely to be damaged. Furthermore, the gripping force applied by the sleeve to the fibers in the bundle ensures good electrical contact between the tape and the fibers.

According to another aspect of the present invention there is provided a fluid separation filter for use in a fluid separation device, the fluid separation filter comprising:

a plurality of elongate fluid separation members aligned parallel to each other; and flexible fixing means for fixing a plurality of fluid separation members together;

wherein the fixing means is adapted to conduct electricity, and a plurality of the fixed fluid separation members are adapted to be rolled into a bundle.

In a preferred embodiment the fixing means is at least one first wire.

In another preferred embodiment at least one first wire is woven between at least adjacent fluid separation members.

In a further preferred embodiment the fixing means is at least one tape, the tape being at least partially adhesive.

In a preferred embodiment there further comprises at least one second wire in electrical contact with at least one tape.

In another preferred embodiment at least one of the first and second wires are at least partially electrically insulated.

In a further preferred embodiment there further comprises a line of potting compound in engagement with at least one fluid separation member, the line being perpendicular to the fluid separation members, before rolling into a bundle.

In a preferred embodiment there further comprises clamping means for compressing the fluid separation members in the bundle together.

In another preferred embodiment the clamping means is at least one ring made of silicone, metal or plastic.

In another preferred embodiment the fluid separation members are at least partially electrically insulated from each other.

In a further preferred embodiment the external surface of at least one fluid separation member is at least partially electroplated.

The filter may further comprise a sleeve of heat shrink material that has been heated to shrink and provide a gripping pressure to said bundle.

According to a further aspect of the invention there is provided a method of forming a fluid separation filter for use in a fluid separation device, the method comprising the steps of:

aligning a plurality of elongate fluid separation members;

fixing a plurality of fluid separation members together using flexible fixing means;

applying a line of potting compound to a plurality of the fluid separation members, the line being perpendicular to the separation members; and rolling a plurality of the fixed fluid separation members into a bundle.

This provides the advantage of enabling potting compound to be applied evenly between the fluid separation members in a bundle. Also the advantage is provided of holding the fluid separation members in a bundle in such a bundle arrangement. Furthermore, if the potting compound is electrically conducting this acts to improve the electrical connection between adjacent fluid separation members in a bundle providing the advantage of increasing the extent to which a substantially similar current may be made to flow through each fluid separation member in the bundle.

In a preferred method the fixing means is at least one first wire.

The method may further include the step of weaving at least one first wire between at least adjacent fluid separation members.

In a further preferred method the fixing means is at least one tape, the tape being at least partially adhesive.

In a preferred method there further includes the step of compressing the fluid separation members in the bundle together.

In another preferred method the step is also included of at least partially electrically insulating the fluid separation members from each other.

In a further preferred method the step is also included of at least partially electroplating the external surface of at least one fluid separation member.

The method may further comprise inserting said bundle into a sleeve of heat shrink material and heating said heat shrink material to provide a gripping pressure to said bundle.

In another aspect of the present invention there is provided a fluid separation filter for use in a fluid separation device, the fluid separation filter comprising:

a plurality of elongate fluid separation members aligned parallel to each other;

flexible fixing means for fixing a plurality of fluid separation members together, the plurality of fixed fluid separation members being adapted to be rolled into a bundle; and a line of potting compound in engagement with a plurality of the fluid separation members the line being perpendicular to the fluid separation members before rolling into a bundle.

In a preferred embodiment the fixing means is at least one first wire.

In another preferred embodiment at least one first wire is woven between at least adjacent fluid separation members.

In a further preferred embodiment the fixing means is at least one tape, the tape being at least partially adhesive.

In a preferred embodiment there further comprises clamping means for compressing the fluid separation members in the bundle together.

In another preferred embodiment the clamping means is at least one ring made of silicone, metal or plastic.

In another preferred embodiment the fluid separation members are at least partially electrically insulated from each other.

In a further preferred embodiment the external surface of at least one fluid separation member is at least partially electroplated.

The filter may further comprise a sleeve of heat shrink material that has been heated to shrink and provide a gripping pressure to said bundle.

Preferred embodiments of the invention will now be described, by way of example only and not in any limitative sense, with reference to the accompanying drawings in which: FIGS. 1 to 12 illustrate the various steps in the formation of a tube mat according to the present invention;

FIG. 13 illustrates the application a potting compound to a tube mat according to the present invention;

FIGS. 14 and 15 illustrate the rolling of a tube mat of FIG. 13 into a bundle;

FIG. 19 illustrates a module for use in conjunction with an air drying device into which a bundle of FIG. 18 has been inserted;

FIG. 20 illustrates a bundle of FIG. 18 to which an electrically insulated connecting wire has been attached;

FIGS. 22 and 23 illustrate a bundle of FIG. 18 being provided with a protective sleeve.

Figure 1:
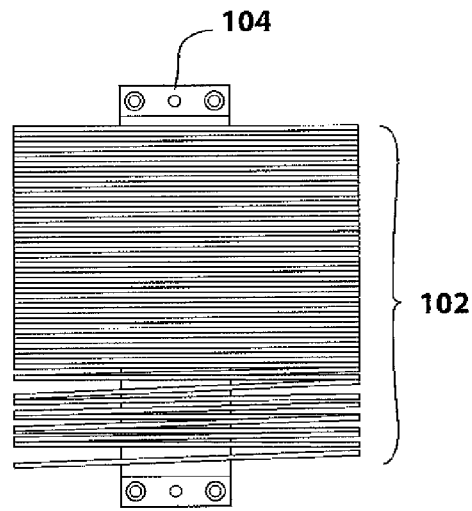
Figure 2:
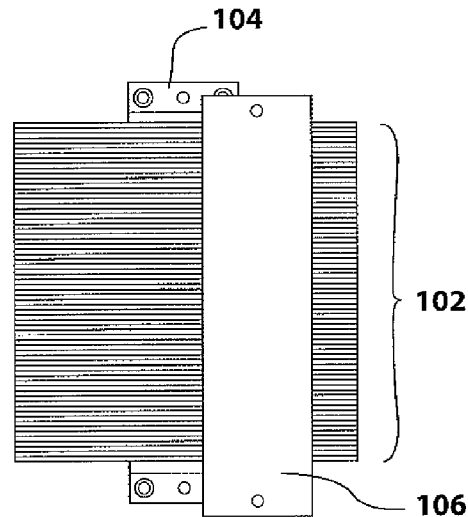
Figure 3:
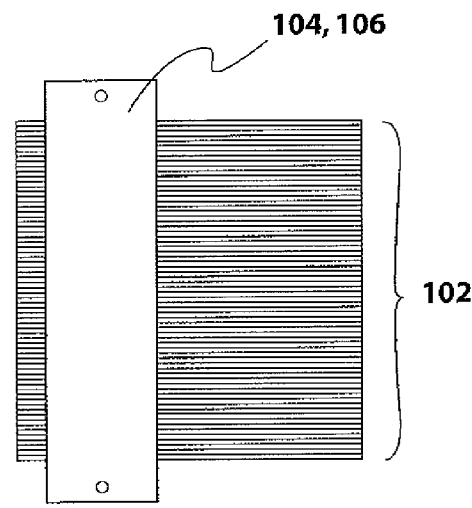

FIGS. 1 to 15 illustrate the various steps involved in the method of forming a fluid separation filter for use in a fluid separation device. In such a method, firstly a plurality of porous elongate tubular members 102 are aligned in the lower half of a jig 104, see FIG. 1. The porous elongate tubular members 102 are, for example, regenerable hollow fiber and electrically heated regenerable fibers of the type described in our earlier application published as WO2008/110820. When all of the porous tubular members 102 are lying flat adjacent one another the top half of the jig 106 is placed onto the tubes 102, see FIG. 2.

The jig 104, 106 is then tightened to such an extent that the porous tubular members 102 are able to move along the axes extending along their respective lengths, but not sideways relative to the jig. Initially the porous tubular members 102 are positioned in the jig 104, 106 such that about 15 mm of each porous tubular member 102 protrudes from one side of the jig, see FIG. 3.

Figure 4:
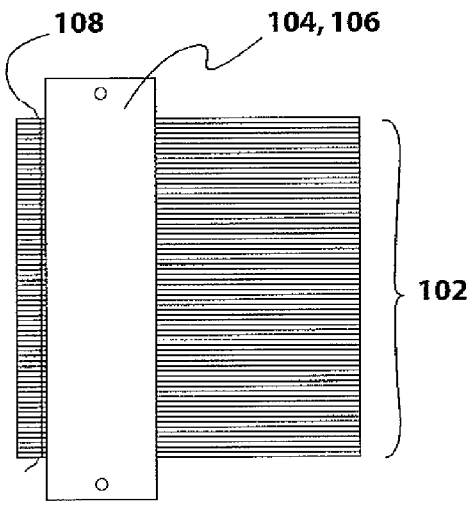
Figure 4:
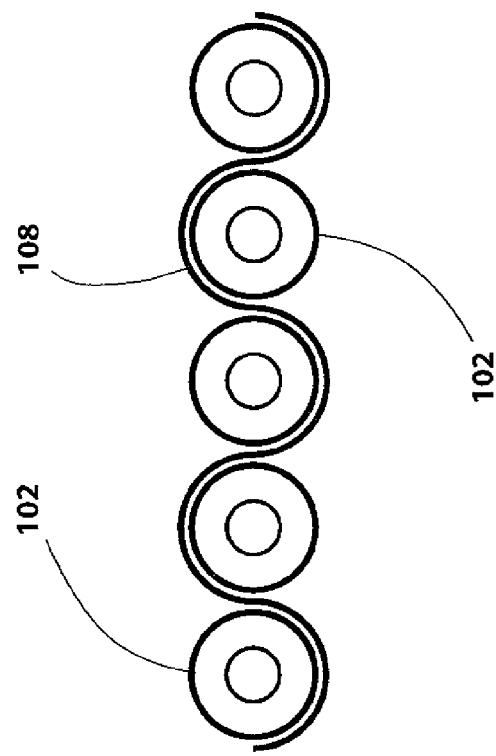
Figure 4:
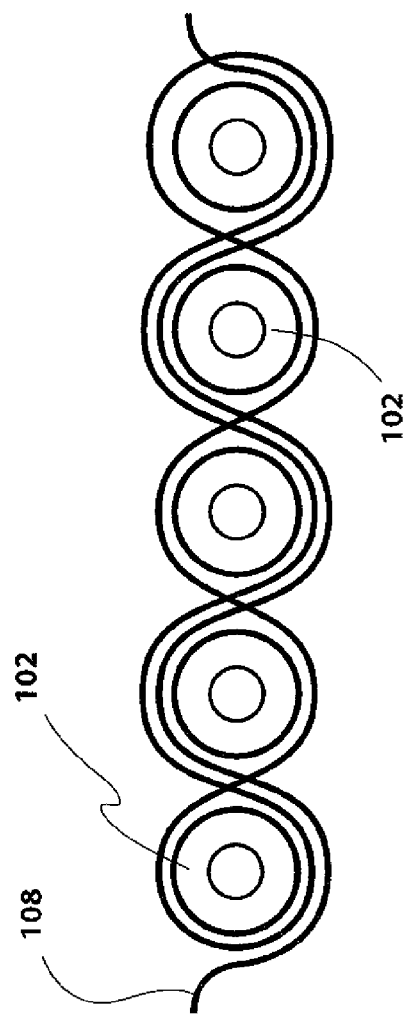

Next a first strand of copper 108 is woven between adjacent protruding porous tubular members 102, see FIGS. 4 and 4A. Such weaving may be performed manually or by a machine. Preferably a strand of copper 108 is woven back and forth between the adjacent protruding porous tubular members 102 five times such that it contacts opposing sides of each protruding porous tubular member 102 thereby maximizing the surface in contact with such members 102, see FIG. 4B. These steps are repeated until the desired number of copper strands 108 have been woven down one side of the jig 104, 106 thereby forming a first strand group 109, see FIG. 5.

Figure 5:
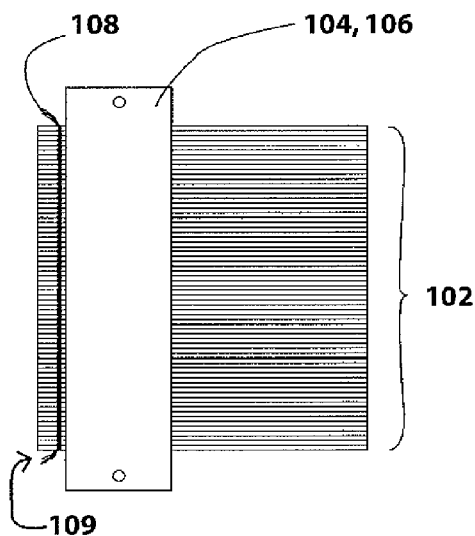
Figure 6:
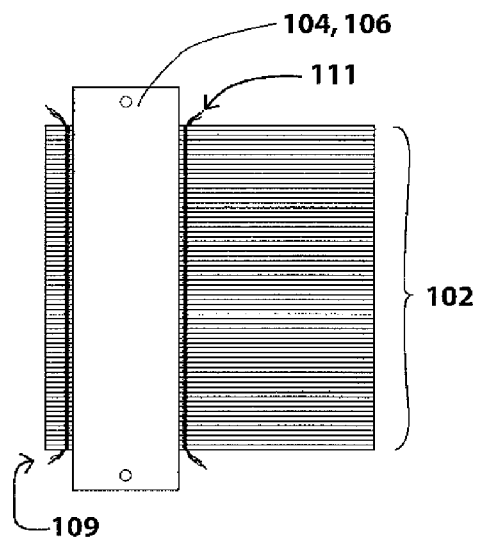

Then, in accordance with the steps illustrated in FIGS. 4 and 5, a plurality of copper strands 108 may, but may not necessarily, be woven down the opposite side of the jig 104, 106, thereby forming a second strand group 111, see FIG. 6.

Figure 7:
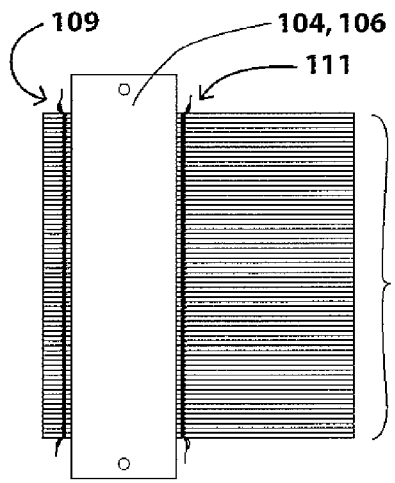

Once the desired number of copper strands 108 have been woven, the loose ends of the copper strands 108 in each respective strand group 109, 111 are twisted together so as to help the 'tube mat', formed from the plurality of porous tubular members 102 so fixed relative to one another by the copper strands 108, to keep its form, see FIG. 7.

Figure 8:
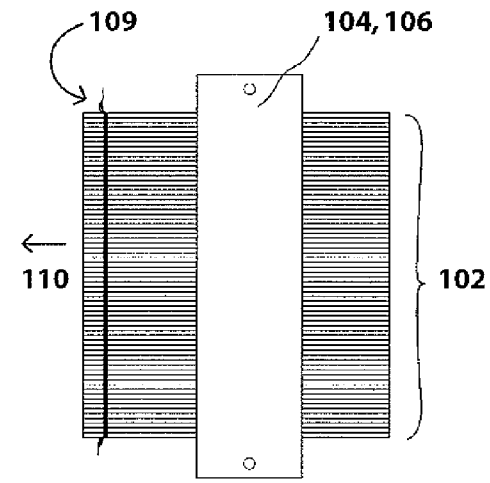
Figure 9:
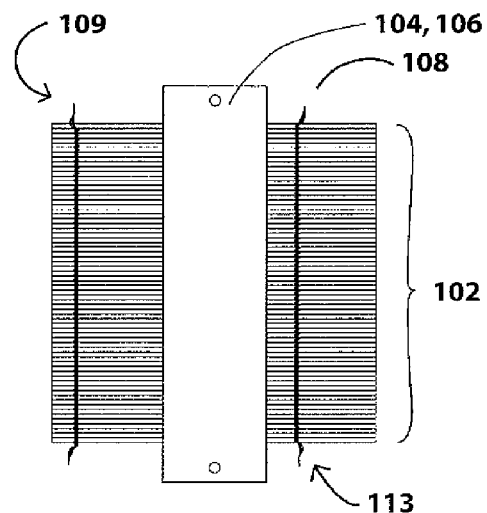

The jig 104, 106 is then loosened and the tube mat is moved along the direction illustrated by arrow 110 in FIG. 8. The jig 104, 106 can be fixed at any point along the length of the porous tubular members 102 forming the tube mat and copper strands 108 may be woven onto the tube mat into more strand groups accordingly as described above, see FIG. 9 which illustrates a third strand group 113.

Figure 10:
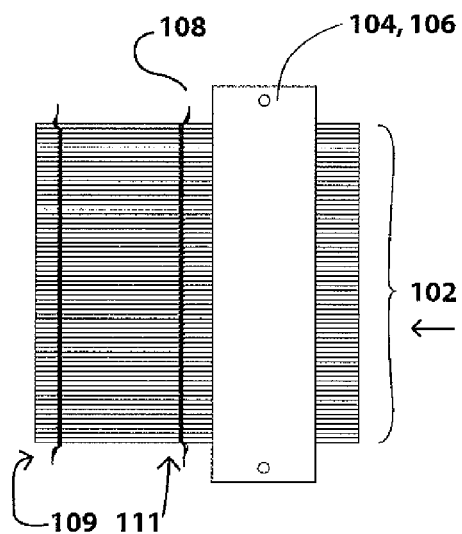
Figure 11:
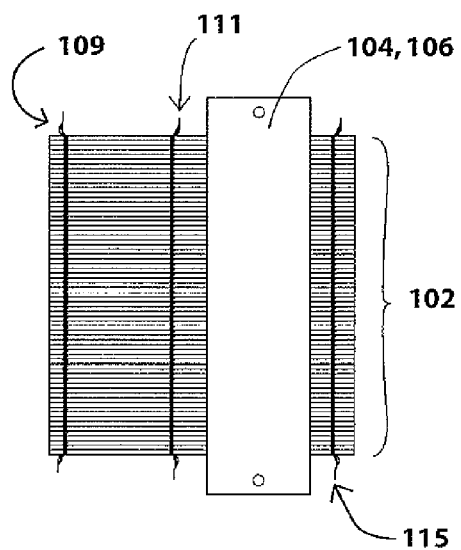

However, with reference to FIGS. 10 and 11, at least one copper strand 108 must be woven a corresponding distance i.e. about 15 mm, along the length of the porous tubular members 102 making up the tube mat from the opposite end of the porous tubular members 102 to which the first strand group 109 was initially woven. FIG. 11 illustrates a fourth strand group 115 being woven in such a position on the tube mat.

After the required number of strand groups have been wound onto the porous tubular members 102 forming the tube mat the mat is then removed from the jig 104, 106. The ends of the copper strands 108 in each respective strand group are then twisted together before being soldered together as close to the tube mat as possible and the excess trimmed, see FIG. 12.

At this point, the porous tubular members 102 in the tube mat may be electrically insulated from each other by coating them in a layer of electrically insulating material such as fluoro-based polymer for example PTFE. The insulation, which runs along the length of the fiber, prevents the fibers from short circuiting with each other and maintains the consistent resistance path along the length of the fiber. Such coating may be achieved by dipping the tube mat into a bath of the electrically insulating material or spraying it onto the tube mat. This coating has the additional benefit of providing corrosion protection of the copper connecting wires.

However, the porous tubular members 102 may have been previously, i.e. before being wound into a tube mat, provided with an electrically insulating sheath so as to electrically insulate adjacent porous tubular members 102 from each other. In this case the areas of the porous tubular members 102 which are intended to contact copper wire are to be stripped of the sheath so as to allow an electrical connection to be made between the copper wire and porous tubular members.

Alternatively, a sheet of electrically insulating material may be brought into contact with the tube mat such that when the tube mat is rolled into a bundle, as will be described shortly, the sheet of electrically insulating material is incorporated Into the bundle.

Figure 16:
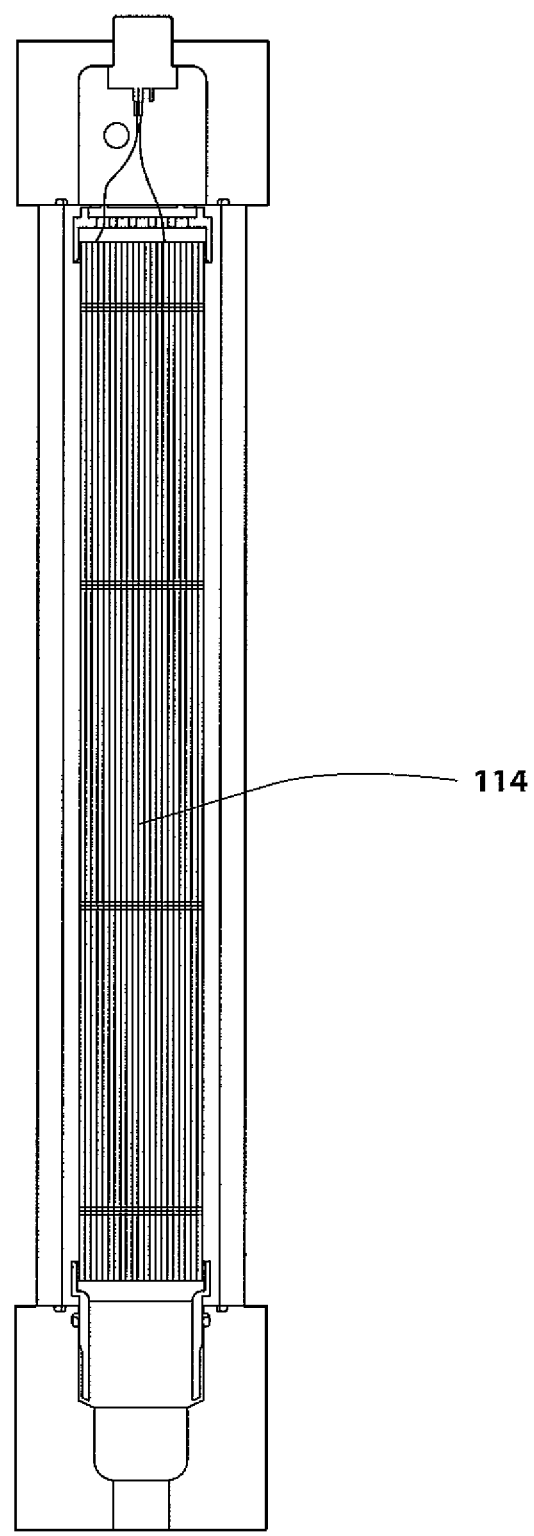
FIG. 16 illustrates an air drying device into which a bundle of FIGS. 14 and 15 may be inserted.

Next, a line of potting compound 112 may then be applied to the porous tubular members 102 of the tube mat, perpendicular to the axes extending along their respective lengths, see FIG. 13. The tube mat is then rolled up into a bundle 114 as illustrated in FIGS. 14 and 15. Such a bundle 114 may then be used in an air drying device for separating water vapor from an air flow, see FIG. 16 and PCT publication number WO2009/053760 A1.

Figure 17:
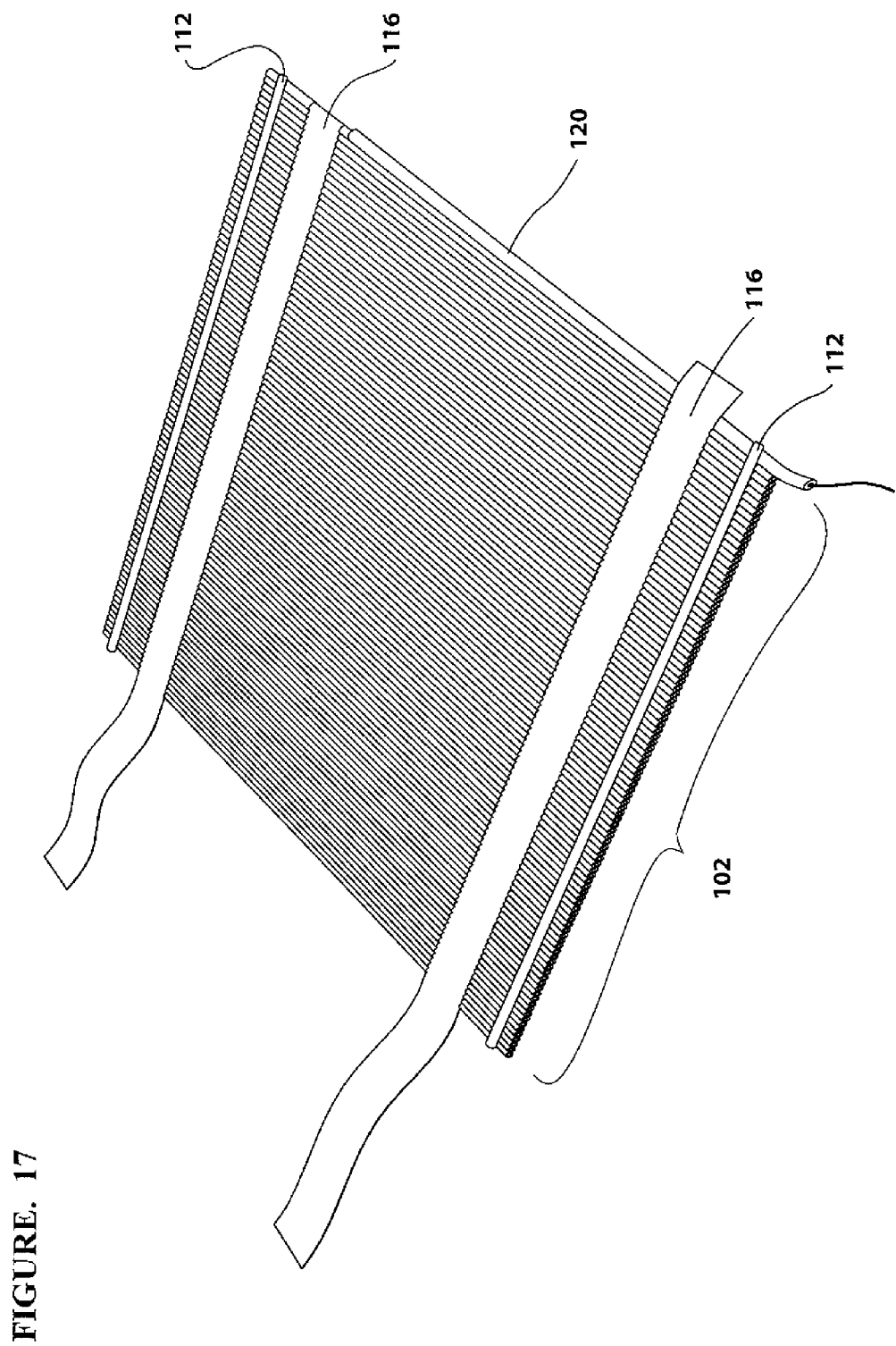
FIG. 17 illustrates the formation of a tube mat of another embodiment of the present invention using adhesive copper tape.
Figure 18:
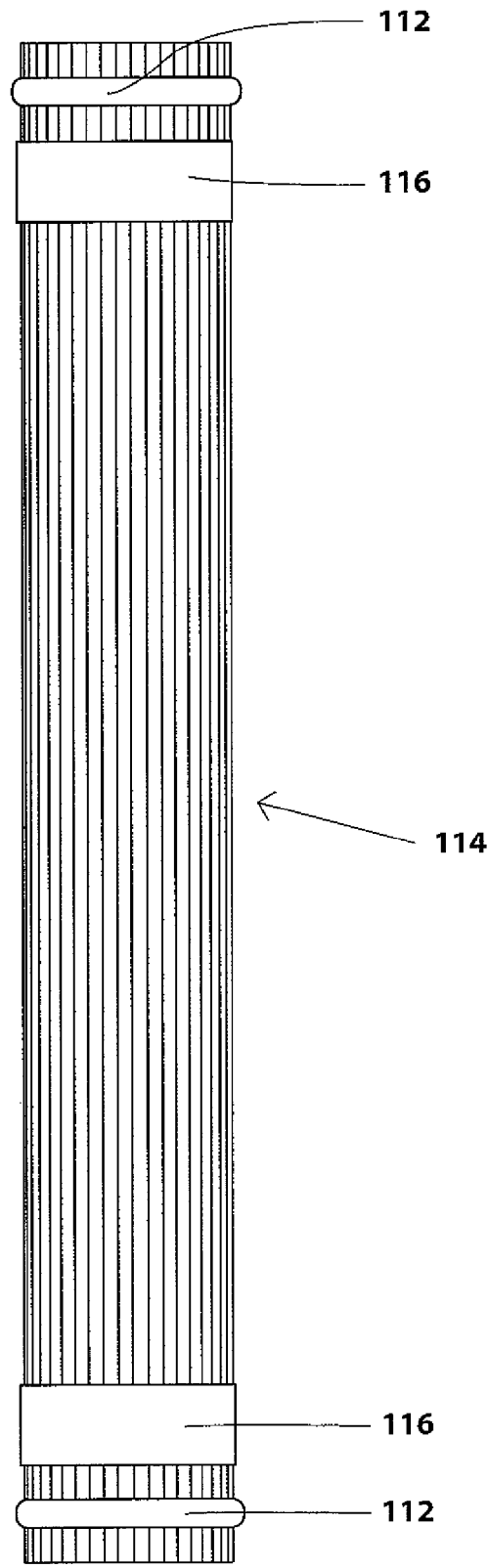
FIG. 18 illustrates a bundle formed from a tube mat of FIG. 17.

Alternatively, rather than fixing porous tubular members 102 relative to one another by weaving copper strands 108 between them, they may be may be fixed relative to one another using copper tape 116 to which adhesive has been applied, see FIG. 17. As described above, potting compound 112 may similarly be applied to porous tubular members 102 so fixed relative to one another by such adhesive copper tape 116 before rolling them into a bundle 114 in a similar manner to that illustrated in FIGS. 14 and 15, see FIG. 18.

In order to apply an electrical current through a bundle 114 of porous tubular members 102 the copper strand groups or copper tapes closest to each end of the bundle 114 are required to be connected to a power source. FIG. 19 illustrates a module 117 into which a bundle 114 is inserted before being included in an air drying device. It is apparent from FIG. 19 that the bundle 114 and wires adapted to connect the bundle 114 to a power source extend into the same aperture 118 of the module 117. Therefore in order to avoid a short circuit the wire connecting the strand group or tape adjacent the end of the bundle 114 extending the furthest into the module 117, is insulated using an insulating sheath 120, see FIG. 20. Such a sheathed connecting wire is also illustrated as 120 in FIG. 17.

Figure 21:
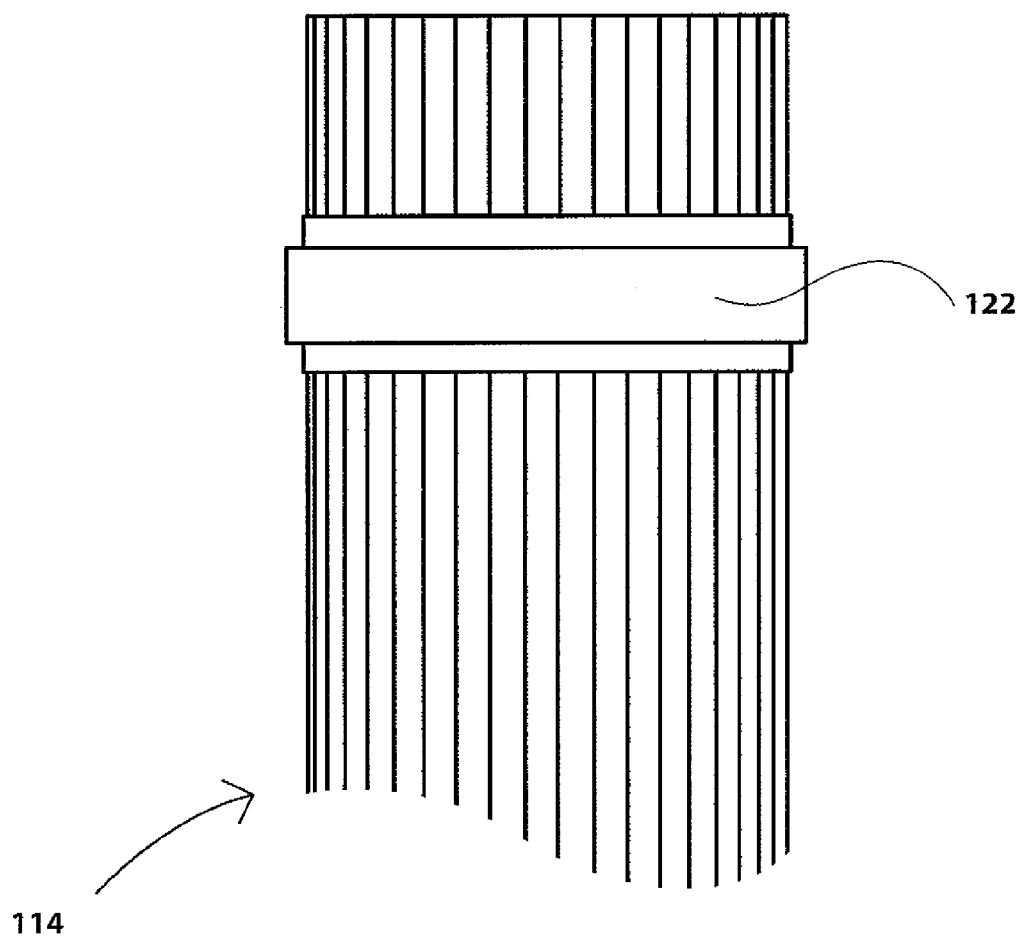
FIG. 21 illustrates a bundle of FIG. 18 to which a clamping ring has been attached.

Also, a clamping ring 122 may be wrapped around a bundle 114 in order to compress the fluid separation members 102 in the bundle 114 together, see FIG. 21. Such a clamping ring 122 may be made of silicone, metal or plastic. As an alternative to the clamping ring, the bundle 114 is placed into a tubular sleeve 124 of heat shrink material (see FIG. 22). The sleeve 124 is then heated causing the sleeve to shrink to provide a firm grip around the bundle 114 (see FIG. 23). The sleeve therefore serves the dual purposes of maintaining the bundle under compression ensuring good electrical contact between the tape or wire and providing protection for the fibers once they are formed into the bundle. The sleeve is formed from premium grade, flexible, flame retarded, Polyolefin 2:1 heat shrink tubing. However, this is simply one example of suitable heat shrink material.

Figure 12:
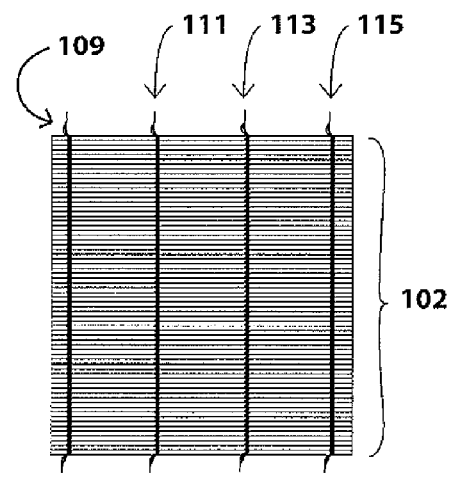

In the example shown in FIG. 12 there are 4 groups of wires 109, 111, 113 and 115. When the bundle is formed non-adjacent pairs of wires can have a voltage applied to them. This shortens the length of the fiber through which the current must travel to heat the fiber. This is particularly useful when using the bundles with low voltage supplies allowing rapid heating of the fiber in spite of the low voltage being used.

Furthermore, in some applications it may not be necessary to heat a bundle in order to regenerate its adsorbent properties following saturation. In such a case a filter for use in an air drying device may be formed by fixing a plurality of porous tubular members 102 together in a tube mat arrangement similarly as described above using wire or adhesive tape which is not electrically conducting before rolling into a bundle. In this instance potting compound can be added in a line that runs perpendicular to the tubular members. Sufficient potting compound is applied to ensure that when the tubular members are rolled into a bundle, the compound forms around each member to form a complete seal.

It will be appreciated by persons skilled in the art that the above embodiments have been described by way of example only and not in any limitative sense, and that various alterations and modifications are possible without departure from the scope of the invention as defined by the appended claims. For example porous tubular members 102 fixed relative to one another may be rolled into a bundle 114 without applying potting compound 112 to the tubular members 102. The potting compound can be closer to the ends of the fibers than the wire or tape or the tape of wire can be closer to the ends. The porous tubular members 102 may have any cross sectional shape. A tube mat described above may be formed from porous tubular members 102 fixed relative to one another by strands or tapes made of any flexible material not specifically copper silicone, metal or plastic. To improve the electrical conduction between the porous tubular members 102 and strands of copper wire 108 in a tube mat, the areas of the porous tubular members 102 which are intended to contact strands of copper wire 108 may be electroplated using electrolysis with for example copper.

What is claimed is:

1. A method of forming a fluid separation filter for use in a fluid separation device, the method comprising the steps of:
   aligning a plurality of elongate fluid separation members;
   fixing a plurality of said fluid separation members together using a plurality of one flexible fixing members thereby forming a mat, the flexible fixing members adapted to conduct electricity; and
   rolling said mat into a bundle of said fluid separation members, wherein a plurality of said flexible fixing members conduct electricity and at least one first said electrically conducting flexible fixing member is connected to a first terminal of a power supply and at least one second said electrically conducting flexible fixing member is connected to a second terminal of a power supply thereby allowing a current to pass between said first and second electrically conducting flexible fixing members via said elongate fluid separation member.

2. The method of claim 1, further comprising the step of applying a line of potting compound to said fluid separation members, said line being perpendicular to the longitudinal axis of said separation members, before rolling into a bundle.

3. The method of claim 1, further comprising the step of compressing said fluid separation members in said bundle together.

4. The method of claim 1, further comprising the step of at least partially electroplating the external surface of at least one said fluid separation member.

5. The method of claim 1, further comprising inserting said bundle into a sleeve of heat shrink material and heating said heat shrink material to provide a gripping pressure to said bundle.

6. The method of claim 1, wherein said plurality of fixing members comprise a plurality of first wires.

7. The method of claim 6, further comprising the step of weaving said first wire between adjacent fluid separation members.

8. The method of claim 1, wherein said plurality of fixing members comprises a plurality of tapes, said tapes being at least partially adhesive.

9. The method of claim 8, further comprising the step of bringing at least one second wire into electrical contact with at least one said tape.

10. A fluid separation filter for use in a fluid separation device, the fluid separation filter comprising:
    a plurality of elongate fluid separation members aligned parallel to each other; and
    a plurality of flexible fixing members fixing a plurality of said fluid separation members together thereby forming a mat;
    wherein said plurality of flexible fixing members conduct electricity, and said mat is rolled into a bundle of said fluid separation members and wherein at least one first said electrically conducting flexible fixing member is connected to a first terminal of a power supply and at least one second said electrically conducting flexible fixing member is connected to a second terminal of a power supply thereby allowing a current to pass between said first and second electrically conducting flexible fixing members via said elongate fluid separation member.

11. The fluid separation filter of claim 10, further comprising a line of potting compound in engagement with at least one said fluid separation member, said line being perpendicular to the longitudinal axis of said fluid separation members, before rolling into a bundle.

12. The fluid separation filter of claim 10, further comprising at least one clamping device compressing said fluid separation members in said bundle together.

13. The fluid separation filter of claim 11, wherein said at least one clamping device comprises at least one ring made of a material selected from the group consisting of silicone, metal or plastic.

14. The fluid separation filter of claim 10, further comprising a sleeve of heat shrink material that has been heated to shrink and thereby provide a gripping pressure to said bundle.

15. The fluid separation filter of claim 10, wherein said plurality of fixing members comprises a plurality of first wires.

16. The fluid separation filter of claim 15, wherein said first wires are woven between at least adjacent said fluid separation members.

17. The fluid separation filter of claim 10, wherein said plurality of fixing members comprises a plurality of tapes, said tapes being at least partially adhesive.

18. The fluid separation filter of claim 17, further comprising at least one second wire in electrical contact with at least one said tape.

* * * * *